(12) United States Patent
Barton (10) Patent No.: US 7,672,961 B2
(45) Date of Patent: Mar. 2, 2010

(54) DATABASE HAVING HETEROGENEOUS OBJECT TYPES

(75) Inventor: Lee B. Barton, Winchester, MA (US)

(73) Assignee: Oracle International Corp., Redwood Shores, CA (US)

(*) Notice: Subject to any disclaimer, the term of this patent is extended or adjusted under 35 U.S.C. 154(b) by 603 days.

(21) Appl. No.: 11/549,947

(22) Filed: Oct. 16, 2006

(65) Prior Publication Data

US 2007/0198579 A1    Aug. 23, 2007

Related U.S. Application Data

(62) Division of application No. 10/014,038, filed on Dec. 10, 2001, now Pat. No. 7,124,140.

(51) Int. Cl.
G06F 17/00 (2006.01)
G06F 7/00 (2006.01)

(52) U.S. Cl. .................. 707/101; 707/102; 707/103 R; 707/204

(58) Field of Classification Search ........................ None
See application file for complete search history.

(56) References Cited

U.S. PATENT DOCUMENTS

| | | | | |
|---|---|---|---|---|
| 6,026,408 | A * | 2/2000 | Srinivasan et al. | 707/103 R |
| 6,272,503 | B1 * | 8/2001 | Bridge et al. | 707/204 |
| 6,381,600 | B1 * | 4/2002 | Lau | 707/6 |
| 6,684,219 | B1 * | 1/2004 | Shaw et al. | 707/103 R |
| 6,708,186 | B1 * | 3/2004 | Claborn et al. | 707/102 |
| 6,950,828 | B2 * | 9/2005 | Shaw et al. | 707/103 R |
| 7,093,200 | B2 * | 8/2006 | Schreiber et al. | 715/835 |
| 7,099,885 | B2 * | 8/2006 | Hellman et al. | 707/103 R |
| 7,124,140 | B2 * | 10/2006 | Barton | 707/101 |
| 2003/0110179 | A1 * | 6/2003 | Barton | 707/101 |
| 2003/0163597 | A1 * | 8/2003 | Hellman et al. | 709/316 |
| 2003/0179228 | A1 * | 9/2003 | Schreiber et al. | 345/738 |
| 2005/0055351 | A1 * | 3/2005 | Barton et al. | 707/10 |
| 2005/0091223 | A1 * | 4/2005 | Shaw et al. | 707/100 |
| 2006/0156253 | A1 * | 7/2006 | Schreiber et al. | 715/835 |
| 2006/0167946 | A1 * | 7/2006 | Hellman et al. | 707/104.1 |
| 2007/0011192 | A1 * | 1/2007 | Barton | 707/103 R |

OTHER PUBLICATIONS

Oracle "Oracle9I Application Developers Guide—XML, Release 1 (9.0.1)". part No. A88894-01, 2001.*

* cited by examiner

*Primary Examiner*—Luke S Wassum (57) ABSTRACT

A method for extracting metadata for plural related objects of different types from a database includes defining a heterogeneous object type as a collection of database objects of different types. Upon a request to fetch a particular heterogeneous object, member objects of the heterogeneous object are fetched from the particular heterogeneous object in a specific order based on the definition of the heterogeneous object's type, such as a valid order for re-creating the particular heterogeneous object. The set of member objects to be fetched can be restricted according to at least one specified filter, which itself may be translated into a second filter according to a type of a member object being fetched. Such translated filters can inherit values from the filter specified in the request for the particular heterogeneous object type, or can have a fixed value of some data type. The extracted metadata can be formatted to recreate the particular heterogeneous object.

28 Claims, 5 Drawing Sheets

30 metaview$

| | type 41 | flags 42 | properties 43 | model 44 | version 45 | ... | xmltag 46 | udt 47 | schema 48 | viewname 49 |
|---|---|---|---|---|---|---|---|---|---|---|
| 31 | DATABASE_EXPORT | 0 | 2 | ORACLE | 0900000000 | | NULL | NULL | NULL | NULL |
| 32 | SCHEMA_EXPORT | 0 | 2 | ORACLE | 0900000000 | | NULL | NULL | NULL | NULL |
| 33 | TABLESPACE_EXPORT | 0 | 2 | ORACLE | 0900000000 | | NULL | NULL | NULL | NULL |
| 34 | TABLE_EXPORT | 0 | 2 | ORACLE | 0900000000 | | NULL | NULL | NULL | NULL |

FIG. 3

50 metafilter$

| | filter 53 | type 54 | model 55 | properties 56 | ... | view_attr 57 | attrname 58 | default_val 59 |
|---|---|---|---|---|---|---|---|---|
| 51 | NAME | TABLE_EXPORT | ORACLE | 0 | | 0 | NULL | NULL |
| 52 | SCHEMA | TABLE_EXPORT | ORACLE | 0 | | 0 | NULL | NULL |

60 metascript$

| | ptype<br>64 | seq#<br>65 | ltype<br>66 | model<br>67 |
|---|---|---|---|---|
| | ⋮ | | | |
| 61 | TABLE_EXPORT | 10 | TABLE | ORACLE |
| 62 | TABLE_EXPORT | 20 | OBJECT_GRANT | ORACLE |
| 63 | TABLE_EXPORT | 30 | INDEX | ORACLE |
| | ⋮ | | | |

FIG. 4

70 metascriptfilter$

| ptype 80 | seq# 81 | filter 82 | pfilter 83 | vcval 84 | bval 85 | model 86 |
|---|---|---|---|---|---|---|
| TABLE_EXPORT | 10 | NAME | NAME | NULL | NULL | ORACLE |
| TABLE_EXPORT | 10 | SCHEMA | SCHEMA | NULL | NULL | ORACLE |
| TABLE_EXPORT | 20 | BASE_OBJECT_NAME | NAME | NULL | NULL | ORACLE |
| TABLE_EXPORT | 20 | BASE_OBJECT_SCHEMA | SCHEMA | NULL | NULL | ORACLE |
| TABLE_EXPORT | 30 | BASE_OBJECT_NAME | NAME | NULL | NULL | ORACLE |
| TABLE_EXPORT | 30 | BASE_OBJECT_SCHEMA | SCHEMA | NULL | NULL | ORACLE |

DATABASE HAVING HETEROGENEOUS OBJECT TYPES

RELATED APPLICATIONS

This application is a Divisional Application of earlier filed U.S. patent application Ser. No. 10/014,038 entitled "DATABASE HAVING HETEROGENEOUS OBJECT TYPES," filed on Dec. 10, 2001 now U.S. Pat. No. 7,124,140, the entire teachings of which are incorporated herein by this reference.

BACKGROUND

The logical structure of a typical relational database is determined by its dictionary objects. These objects can be of a number of object types, e.g., tablespaces, users, tables, views, sequences, stored procedures, etc.

The Oracle Metadata API, introduced in Oracle 9i, provides a central facility for extracting metadata for one or more objects of a specific object type. The 9i implementation uses an OPEN-FETCH-CLOSE programming model: the user issues an OPEN for a particular object type and then repeatedly FETCHes objects of that type; upon completion, the user CLOSEs the object type context. A user can specify one or more filters that restrict the set of objects to be fetched. The Oracle 9i implementation provides a powerful and flexible mechanism for fetching objects within a particular object type.

This API is described in U.S. application Ser. No. 09/672,914, filed on Sep. 28, 2000, "Aggregating and manipulating dictionary metadata in a database system," the entire teachings of which are incorporated by reference herein in their entirety.

SUMMARY

Often, a user may wish to extract the metadata for a logical set of objects that belong to different object types while comprising a logical unit. Examples are (1) a table and all of its dependent objects (constraints, indexes, grants, etc.); (2) all objects in a schema (tables, views, types, procedures, etc.); (3) all objects in the database (tablespaces, users, rollback segments, etc., as well as schemas and their contents).

Furthermore, the user may wish to take this extracted metadata and use it to recreate the logical set of objects on another database. To recreate the set of objects, however, they must be created in a specific order, e.g., a table before its indexes. Unfortunately, the creation order is frequently not obvious.

In prior solutions, users had to write custom code encapsulating knowledge of the objects making up the logical set, as well as the creation order for the objects. The Oracle Export utility is one such custom program. Such custom programs are usually well-designed for their specific purpose but can be difficult to adapt to new uses.

The present system can enhance the Oracle Metadata API described in U.S. Ser. No. 09/672,914 with "heterogeneous object types," i.e., collections of objects that, although of different object types, nevertheless comprise a logical unit. The programming model can be the same OPEN-FETCH-CLOSE model used in Oracle 9i. The differences are that (1) the user specifies, in the OPEN statement, the name of a heterogeneous object type, (2) the objects fetched belong to different homogeneous object types, and (3) the objects are returned in a valid creation order.

A particular embodiment of the present system is a method for extracting metadata for plural related objects of different types from a database. The method can include defining a heterogeneous object type as a collection of database objects of different types. Upon a request to fetch a particular heterogeneous object, member objects of the heterogeneous object can be fetched from the particular heterogeneous object. Member objects can be returned in a specific order, such as a valid order for re-creating the particular heterogeneous object, based on the definition of the heterogeneous object's type.

Exemplary heterogeneous object types are table export, database export, schema export and tablespace export types. Member objects can be homogeneous object types, or can be other heterogeneous object types.

The set of member objects to be fetched can be restricted according to at least one specified filter, which itself may be translated into a second filter according to a type of a member object being fetched.

In a particular embodiment, a first table can specify whether an object type is a heterogeneous or a homogeneous object type. A second table can then define the specific order in which member types for a given heterogeneous object type are to be returned. Upon a fetch command, member objects can be fetched according to the specific order defined in the second table. A third table can specify filters that can be applied to a particular heterogeneous object type, and a fourth table can specify filter translations for individual member object types. Such translated filters can inherit values from the filter specified in the request for the particular heterogeneous object type. Alternatively, a filter can have a fixed value of some data type, such as text, boolean, numeric, date, etc.

More particularly, the extracted metadata can be formatted using a markup language, such as XML. This markup language-formatted data can be translated into statements formatted to recreate the particular heterogeneous object.

In the present system, object metadata can be extracted from a relational database using just a single request for metadata for a logical unit within the database, where the logical unit comprises plural objects of different types. The requested metadata can then be extracted, and returned in an order in which the logical unit can be recreated on this or another database. While the single request may contain multiple fetches, it is a single request in that only one object type (i.e., the particular heterogeneous object type) is opened and the user does not need to be aware of the internal dependencies to extract all of the member objects.

A logical unit may comprise, for example, a table and its dependent objects, such as, but not limited to, constraints, indexes and/or grants. Other logical units may comprise, but are not limited to, schemas and databases.

BRIEF DESCRIPTION OF THE DRAWINGS

The foregoing and other objects, features and advantages of the database system having heterogeneous object types will be apparent from the following more particular description of particular embodiments, as illustrated in the accompanying drawings in which like reference characters refer to the same parts throughout the different views.

DETAILED DESCRIPTION

The present system adds heterogeneous types to the Metadata API previously described by U.S. application Ser. No. 09/672,914.

Particular heterogeneous object types are added by inserting rows into dictionary, or system, tables. One table (metaview$) contains the names of all object types, with a flag indicating whether the type is homogeneous or heterogeneous. Another table (metascript$) defines the member types belonging to the heterogeneous type and their order. The code implementing the FETCH function determines whether the object type is homogeneous, in which case it does the normal processing, or whether the object type is heterogeneous, in which case it calls itself recursively for each of the member types.

Heterogeneous object types can be recursively nested, i.e., one heterogeneous type can be a member of another heterogeneous type. As with homogeneous object types, users can specify filters on a heterogeneous object type that restrict the set of objects to be fetched. These filters are translated into filters on the member types; the translation is specified in another dictionary table (metascriptfilter$).

EXAMPLE

The following example demonstrates how the metadata API (dbms_metadata) fetches a heterogeneous object—that is, an ordered set of objects which, although they are of different object types, nevertheless comprise a logical unit. In this example, the heterogeneous object is of type TABLE_EXPORT, consisting of a table and its indexes.

First, assume the following script is executed to create, in schema "SCOTT," a table named "EMPLOYEE" having two columns, "empno" and "empname." Two indexes are created on the table, namely "EMP_IND1" and "EMP_IND2." Connection to the schema is presumed.

```
create table EMPLOYEE (
    empno     number,
    empname   varchar2(30));
create index EMP_IND1 on EMPLOYEE(empno);
create index EMP_IND2 on EMPLOYEE(empname);
```

Figure 1:
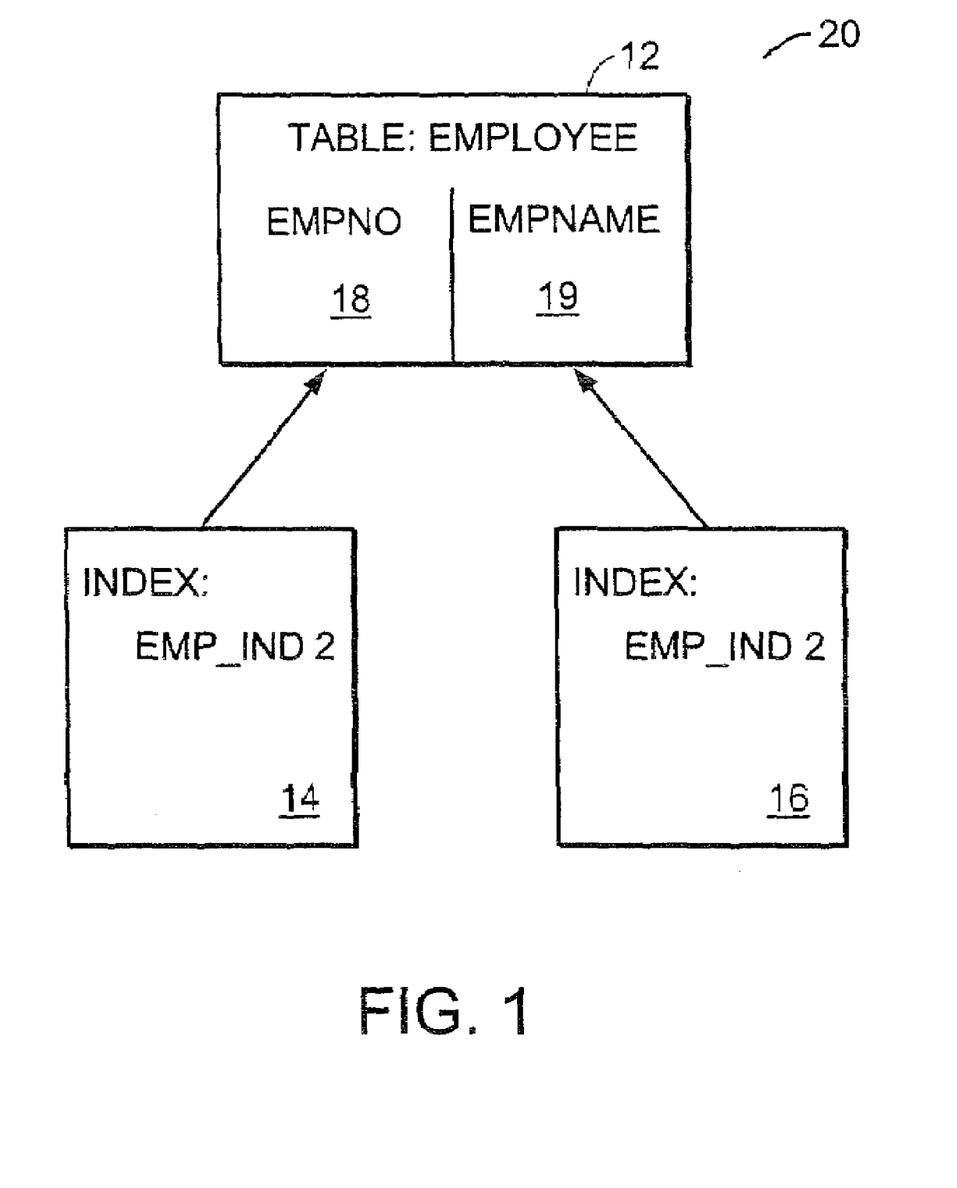
FIG. 1 is a schema diagram illustrating the objects created in an example of the present system and their relationships.

FIG. 1 is a schema diagram illustrating the resulting objects and their relationships. A heterogeneous object 20 of type TABLE_EXPORT comprises the table "EMPLOYEE" 12, having the two columns empno 18 and empname 19, and the two indexes 14, 16 on each of the columns.

We now fetch, using a single request comprising a single OPEN, one or more FETCHES, and a single CLOSE command, the heterogeneous TABLE_EXPORT object 20 that comprises the table 12 and its two indexes 14,16. The members 12,14, 16 of the heterogeneous object 20 are returned in a valid creation order. That is, the table 12 is returned first, since it must be created before the indexes 14,16. Below is an exemplary script using the present invention to extract a heterogeneous object. Put_clob( ) represents some simple function which can print out the contents of a clob (a character large object).

```
declare
    h     NUMBER;
    th    NUMBER;
    c     clob;
begin
    h := dbms_metadata.open('TABLE_EXPORT');
    dbms_metadata.set_filter(h,'NAME','EMPLOYEE');
    dbms_metadata.set_filter(h, 'SCHEMA','SCOTT')
    th := dbms_metadata.add_transform(h,'DDL');
    LOOP
            dbms_lob.createtemporary(c,true);
            dbms_metadata.fetch_clob(h,c);
            EXIT WHEN c IS NULL;
            put_clob(c);
            dbms_lob.freetemporary(c);
    END LOOP;
    dbms_metadata.close(h);
END;
```

Each of the dbms_metadata calls is described in U.S. application Ser. No. 09/672,914. As disclosed in that application, calls apply only to homogeneous objects. The present system expands the dbms_metadata interface to include heterogeneous object types such as DATABASE_EXPORT, SCHEMA_EXPORT, TABLE_EXPORT and TABLESPACE_EXPORT.

The OPEN call, dbms_metadata.open( ), provides the heterogeneous class, in this case TABLE_EXPORT, for which metadata is being requested. A handle h is returned to be used in all subsequent operations of the set of objects for which metadata is being requested.

The first FILTER call, dbms_metadata.set_filter( ), restricts the search to the table named "EMPLOYEE," while the second FILTER call restricts the search to the schema named "SCOTT."

The call to dbms_metadata.add_transform( ) causes the output of the FETCH command (see below), which is normally formatted in XML, to be transformed to DDL. The result is then directly usable for recreating the heterogeneous object 20 on another database.

Within the loop, bracketed by the LOOP and END LOOP lines, a temporary character large object (clob) is created. The FETCH call, dbms_metadata.fetch_clob( ), returns an member object from the designated heterogeneous object as a clob. If all such objects have already been returned, a NULL is returned and the loop is exited.

Otherwise, for purposes of this example, the object is displayed (put_clob( )). Next, the temporary clob is freed up. The loop repeats, each time returning a different member object, until all members have been fetched.

Finally, the CLOSE call, dbms_metadata.close( ) is made to end the request.

Execution of the above script results in the following output, where SCOTT is the name of the schema to which the table and the indexes belong.

```
...
CREATE TABLE "SCOTT"."EMPLOYEE"
(    "EMPNO" NUMBER,
     "EMPNAME" VARCHAR2(30)
) PCTFREE 10 PCTUSED 40 INITRANS 1 MAXTRANS 255 LOGGING
STORAGE(INITIAL 10240 NEXT 10240 MINEXTENTS 1 MAXEXTENTS 121
PCTINCREASE 50 FREELISTS 1 FREELIST GROUPS 1 BUFFER_POOL
DEFAULT)
TABLESPACE "SYSTEM"
...
...
CREATE INDEX "SCOTT"."EMP_IND1" ON "SCOTT"."EMPLOYEE" ("EMPNO")
PCTFREE 10 INITRANS 2 MAXTRANS 255
STORAGE(INITIAL 10240 NEXT 10240 MINEXTENTS 1 MAXEXTENTS 121
PCTINCREASE 50 FREELISTS 1 FREELIST GROUPS 1 BUFFER_POOL
DEFAULT)
TABLESPACE "SYSTEM"
...
...
CREATE INDEX "SCOTT"."EMP_IND2" ON "SCOTT"."EMPLOYEE"
("EMPNAME")
PCTFREE 10 INITRANS 2 MAXTRANS 255
STORAGE(INITIAL 10240 NEXT 10240 MINEXTENTS 1 MAXEXTENTS 121
PCTINCREASE 50 FREELISTS 1 FREELIST GROUPS 1 BUFFER_POOL
DEFAULT)
TABLESPACE "SYSTEM"
...
```

The result comprises three CREATE statements, one for the table, and one for each of the indexes.

Figure 2:
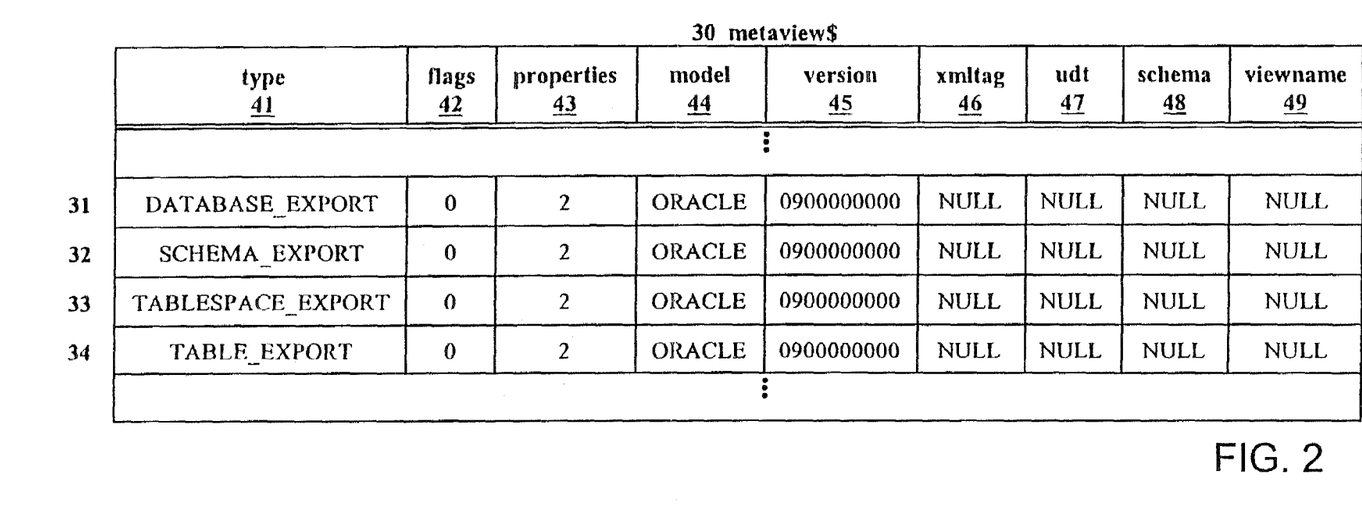
FIG. 2 is a schematic diagram illustrating a metaview$ table which, in addition to supporting homogeneous object types, supports heterogeneous object types of the present system.
Figure 3:
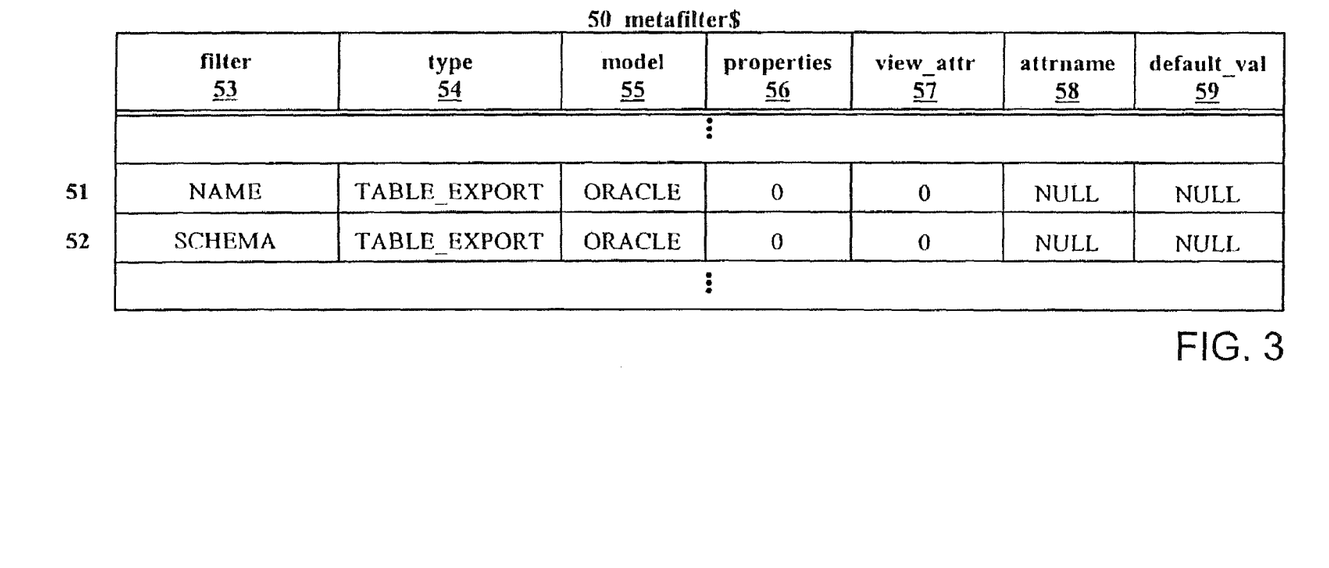
FIG. 3 is a schematic diagram illustrating a metafilter$ table which, in addition to supporting homogeneous object types, supports heterogeneous object types of the present system.
Figure 4:
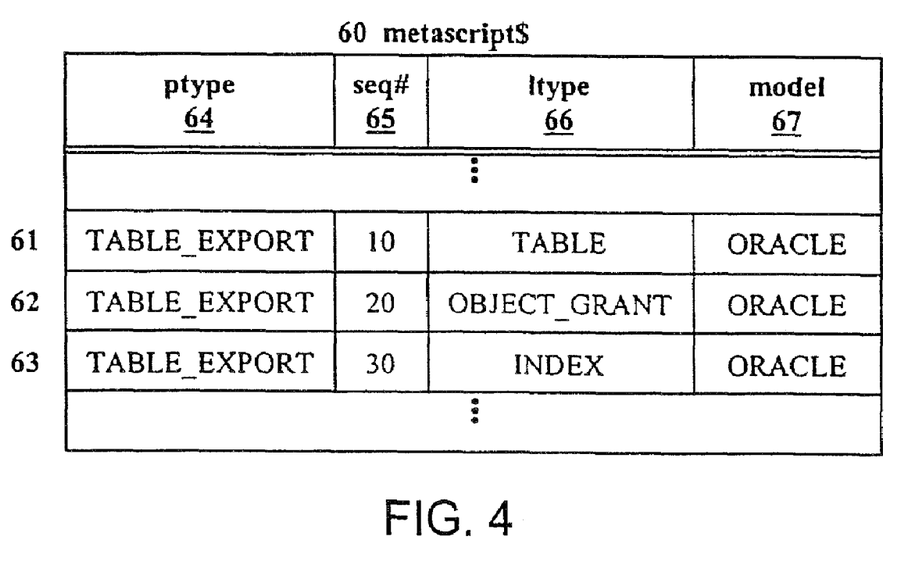
FIG. 4 is a schematic diagram illustrating a metascript$ table, which is used to support heterogeneous object types of the present system.
Figure 5:
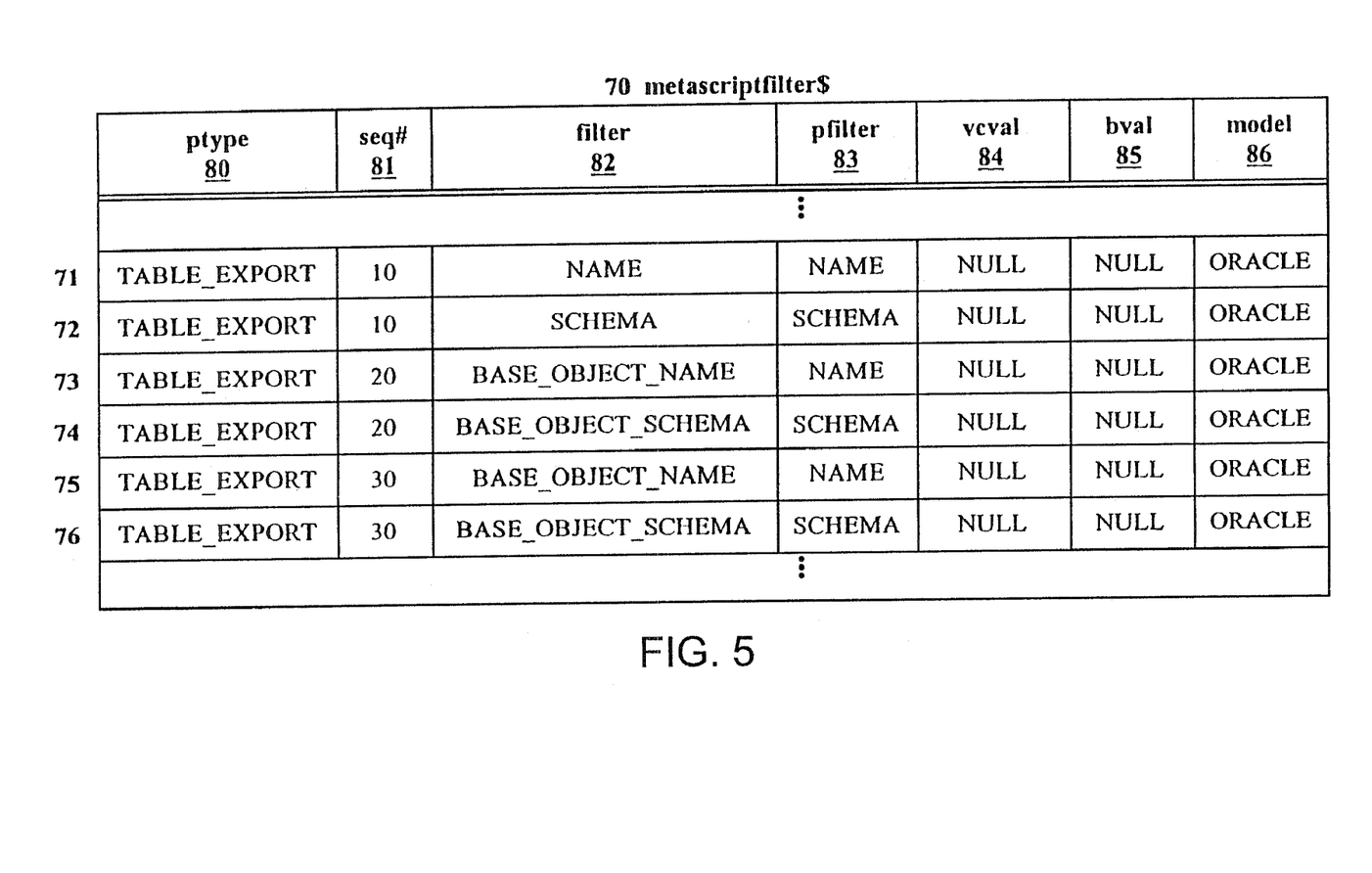
FIG. 5 is a schematic diagram illustrating a metascriptfilter$ table, which is used to support heterogeneous object types of the present system.

FIGS. 2-5 are schematic diagrams of tables used to support heterogeneous object types. The tables of FIGS. 2 and 3 have been defined in the prior art, but are used further to support heterogeneous objects types. The tables of FIGS. 4 and 5 are new.

FIG. 2 illustrates four entries 31-34 in the metaview$ table 30, which is described in U.S. application Ser. No. 09/672,914. This table contains the names of all object types. In an embodiment of the present invention, a new value, e.g., 2, in the properties field 43 is defined to indicate that the row identifies a heterogeneous object type. Here, the presence of the value 2 in the properties field 43 of each of rows 31-34 indicates that the types identified in the type field 41, i.e., DATABASE_EXPORT. SCHEMA_EXPORT, TABLESSPACE_EXPORT and TABLE_EXPORT respectively, are heterogeneous object types.

The other fields 42, 44-49, described in U.S. application Ser. No. 09/672,914, are not of any particular interest with respect to the present system, and are not discussed further.

FIG. 3 illustrates a metafilter$ table 50 used to implement an embodiment of the present system. This table is also described in U.S. application Ser. No. 09/672,914. In order to limit fetches to a particular logical unit, a filter is specified. The metafilter$ table 50 defines the set of filters that are valid for each object type. The filter field 53 provides the name of a filter, while the type field 54 holds the name of a type for which the named filter is valid. For example, here rows 51 and 52 indicate respectively that "NAME" and "SCHEMA" are valid filters that can be applied to heterogeneous type TABLE_EXPORT.

FIG. 4 illustrates the metascript$ table 60, a new table used to implement an embodiment of the present system. The metascript$ table 60 describes the member types of a given heterogeneous object type, as well as the order in which the different member types are to be fetched.

For each heterogeneous type, there is one row for each member type. The ptype field 64 holds the name of the heterogeneous type to which a particular row corresponds. The seq# field 65 is a sequence number. The ltype field 66 holds the leaf or member object name. Leaf or member objects are opened and fetched in the sequence indicated by the seq# field 65.

The model field 67 identifies model properties. This field 67 is not particularly relevant to the present system in particular and is not discussed further.

Several rows 61-63 are illustrated for exemplary purposes. The corresponding sequence numbers in the seq# field 65 of each row indicate that, for a heterogeneous object of type TABLE_EXPORT, objects of type TABLE will be fetched first (row 61, seq#=10), followed by OBJECT_GRANT objects (row 62, seq#=20) and finally, in this example, by all INDEX objects (row 63, seq#=30). Of course, in a live database, the rows can be in a random sequence, which is why a sequence number field 65 is needed.

FIG. 5 illustrates the metascriptfilter$ table 70, which is also a new table created to implement an embodiment of the present system. The metascriptfilter$ table 70 translates the filter provided in the FILTER statement, and matched in field 53 from the metafilter$ table 50, to a filter name for each member object type.

Each row in the metascriptfilter$ table 70 translates the filter name provided by the user to a type-specific filter. For example, a NAME filter can be specified for heterogeneous object type TABLE_EXPORT through a call such as the line in the above program:

dbms_metadata.set_filter(h, 'NAME', 'EMPLOYEE')

where the heterogeneous object type's NAME filter is set to EMPLOYEE, such that only objects where NAME=EMPLOYEE are selected.

The exemplary metacriptfilter$ table 70 of FIG. 5 translates the NAME and SCHEMA filters for the TABLE_EXPORT object to NAME and SCHEMA filters for TABLE object, corresponding to rows 71 and 72 respectively, where seq#=10. Similarly, rows 73 and 74 translate the NAME and SCHEMA filters to BASE_OBJECT_NAME and BASE_OBJECT_SCHEMA for OBJECT_GRANT objects (seq#=20), and row 75 and 76 (seq#=30) translate the NAME and SCHEMA filters to BASE_OBJECT_NAME and BASE_OBJECT_SCHEMA for INDEX objects.

In the example provided, all of the member objects have filters whose values correspond to the NAME and SCHEMA filters on the TABLE_EXPORT object. However, a fixed text or boolean (e.g., TRUE or FALSE) value could be specified for a filter.

For predetermined or fixed value filters, the filter values are stored in the vcval field 84 for text values or in the bval 85 field for boolean values. If, on the other hand, the value is inherited from a filter passed to the script, then the name of the filter is stored in the pfilter field 83.

The metascriptfilter$ table 70 can easily be extended to support fixed value filters of additional data types, such as numbers, dates, etc., by adding additional fields.

The seq# field 81 of a row contains the sequence number and corresponds to the seq# field 65 of the metascript$ table (FIG. 4). The filter field 82 contains the filter name if the value is not fixed. The pfilter field 83 contains the parent filter name. Finally, the model field 86 is not particularly relevant to the present system and is not discussed further.

In one embodiment of the present system, recursive OPEN calls are made specifying object types in order according to the metascript$ table. After each OPEN call, the metascriptfilter$ table is checked, and a SET_FILTER is executed with the appropriate filter name and value.

Thus, in the illustrative example, first TABLE objects where NAME=EMPLOYEE are fetched, followed by OBJECT_GRANTS objects where BASE_OBJECT_NAME=EMPLOYEE, then INDEX objects where BASE_OBJECT_NAME=EMPLOYEE, and so on.

Figure 6:
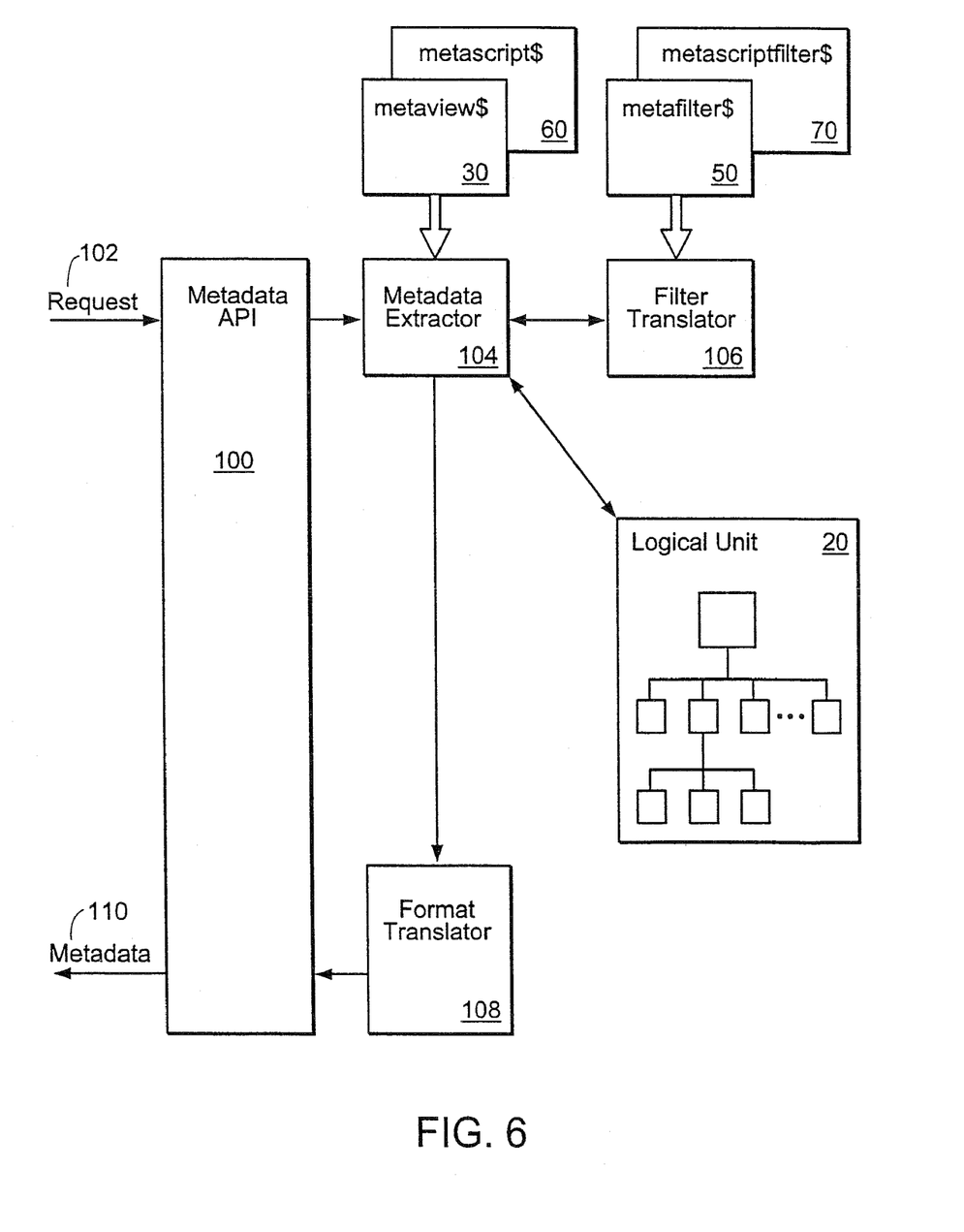
FIG. 6 is a block diagram of representative organization of an embodiment of the present system.

The API allows a user to specify a filter for a specific member type. For example, when fetching objects from a DATABASE_EXPORT heterogeneous type, the user might want to filter out the SYSTEM tablespace (every database automatically has a SYSTEM tablespace, so it does not need to be recreated on a target database). To do this, the user may specify a NAME_EXPR filter that applies only to TABLESPACE objects, meaning "include any tablespace whose name is not 'SYSTEM'", e.g., h:=dbms_metadata.open('DATABASE_EXPORT');
dbms_metadata.set_filter(h,'NAME_EXPR','!="SYSTEM"','TABLESPACE');

FIG. 6 is a block diagram of representative organization of an embodiment of the present system, although it would be understood by one skilled in the art that other organizations are possible which would still fall within the scope of the present invention.

Here, the metadata application program interface (API) 100 accepts heterogeneous object type requests 102 from a user or application. Such requests include, but are not limited to, OPEN and CLOSE commands as well as one or more SET_FILTER and FETCH commands. The commands are passed to a metadata extractor 104 which organizes fetches of the requested heterogeneous object type's member object types in the order dictated according to the metaview$ table 30 and the metascript$ table 60.

A filter translator 106 translates heterogeneous object type filters named in the request 102 into a member object filter for each object type according to the metafilter$ table 50 and metascriptfilter$ table 70 as described previously.

The metadata extractor 104 then extracts, i.e., fetches, the member objects from one or more logical units 20, i.e., according to the heterogeneous object type and the filters provided by the user/application in the request 102.

In one embodiment of the present system, the metadata is extracted as an XML document. A formatter, or format translator, 108 formats the XML document into other formats such as DDL, according to the request 102.

Finally, the API 100 returns this formatted data 110 to the user/application.

The present system gives the user a high-level interface for extracting the objects in a heterogeneous collection. The user does not need to know which objects belong to the collection or their creation order.

The filtering capabilities allow the user great flexibility in customizing the set of objects retrieved.

Because the definition of a heterogeneous type consists of rows in dictionary tables, it is easy to define and maintain new heterogeneous object types. In a custom program such as Oracle's Export utility, for example, adding a new heterogeneous object type requires extensive programming.

The present system represents an advance on the current Export utility, which fetches metadata for heterogeneous collections, but then writes the metadata opaquely to a file in a proprietary format. In contrast, the present system can make the metadata transparently available to any database user.

There is increasing demand for specialized heterogeneous collections, e.g., transportable tablespaces and application-specific subsets of objects. The present system can make new heterogeneous collections easy to define and maintain.

Those of ordinary skill in the art should recognize that methods involved in a DATABASE SYSTEM HAVING HETEROGENEOUS OBJECT TYPES may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

While this system has been particularly shown and described with references to particular embodiments, it will be understood by those skilled in the art that various changes in form and details may be made without departing from the scope of the invention encompassed by the appended claims. For example, the methods of the invention can be applied to various environments, and are not limited to the described environment.

What is claimed is:

1. A computer readable medium encoded with computer programming logic that when executed on a process in a computerized device provides a database in which plural related objects of different types are defined, the programming logic comprising:
    a definition of at least one heterogeneous object type as a collection of member database objects of different types;
    an order specification for fetching member object types of the at least one heterogeneous object type in a specified order, wherein the specified order is a valid order for re-creating the particular heterogeneous object;
    a filter associated with a heterogeneous object type, a set of member objects of said heterogeneous object type to be fetched being restricted according to the filter; and
    a filter translator which translates the filter to a second filter according to a type of a member object being fetched.

2. The computer readable medium of claim 1, wherein a heterogeneous object type is a table export type.

3. The computer readable medium of claim 1, wherein a heterogeneous object type is a database export type.

4. The computer readable medium of claim 1, wherein a heterogeneous object type is a schema export type.

5. The computer readable medium of claim 1, wherein a heterogeneous object type is a tablespace export type.

6. The computer readable medium of claim 1, wherein a heterogeneous object type includes another heterogeneous object type.

7. The computer readable medium of claim 1, further comprising:
a first table which specifies heterogeneous object types; and
a second table which specifies the order in which member types for a given heterogeneous object type are to be returned.

8. The computer readable medium of claim 7, further comprising:
a third table which specifies filters that can be applied to the particular heterogeneous object type.

9. The computer readable medium of claim 8, further comprising:
a fourth table which provides filter translations for individual member object types.

10. The computer readable medium of claim 9, wherein a translated filter inherits a filter value from a filter specified for the particular heterogeneous object type.

11. The computer readable medium of claim 9, wherein a filter defined in the fourth table has a fixed text value.

12. The computer readable medium of claim 9, wherein a filter defined in the fourth table has a fixed boolean value.

13. The computer readable medium of claim 1, further comprising:
the metadata is returned in a formatted markup language.

14. The computer readable medium of claim 13, wherein the formatted markup language is XML.

15. The computer readable medium of claim 13, further comprising:
a translator which translates the markup language-formatted data into statements formatted to recreate the particular heterogeneous object.

16. A computer readable medium encoded with computer programming logic that when executed on a process in a computerized device provides a database for storing data for retrieval, the programming logic comprising:
an interface which receives a single request for metadata for a logical unit within the database, the logical unit comprising plural objects of different types;
an extractor which extracts the requested metadata, wherein the extractor is restricted to objects based on a heterogeneous object type filter specified in the request;
a formatter which formats and returns the extracted metadata in a specified order, where the specified order is an order in which the logical unit can be recreated; and
a filter translator which translates the heterogeneous object type filter to a member object filter associated with a member object type, the extractor being restricted to member objects of the member object type based on the member object filter.

17. The computer readable medium of claim 16, wherein the logical unit comprises a table and its dependent objects.

18. The computer readable medium of claim 17, wherein a dependent object is a constraint.

19. The computer readable medium of claim 17, wherein a dependent object is an index.

20. The computer readable medium of claim 17, wherein a dependent object is a grant.

21. The computer readable medium of claim 16, wherein the logical unit comprises all objects in a schema.

22. The computer readable medium of claim 16, wherein the logical unit comprises all objects in the database.

23. The computer readable medium of claim 16, wherein the extracted metadata is used to recreate the logical unit of objects on another database.

24. The computer readable medium of claim 16, wherein the member object filter value is inherited from the heterogeneous object type filter.

25. The computer readable medium of claim 16, wherein the member object filter value is specified as a fixed value.

26. The computer readable medium of claim 25, wherein the fixed value is a boolean value.

27. The computer readable medium of claim 25, wherein the fixed value is a text value.

28. The computer readable medium of claim 16, wherein the single request comprises a single OPEN command, a single CLOSE command, and at least one FETCH command.

* * * * *